No. 733,592. PATENTED JULY 14, 1903.
R. M. PAYNE.
TIRE TIGHTENER.
APPLICATION FILED JAN. 14, 1903.
NO MODEL.

Witnesses
Edwin G. McKee
F. W. Pier.

Inventor
Robert M. Payne.
By Harry L. Ames,
Attorney

No. 733,592.                                          Patented July 14, 1903.

UNITED STATES PATENT OFFICE.

ROBERT M. PAYNE, OF WINCHESTER, TENNESSEE.

TIRE-TIGHTENER.

SPECIFICATION forming part of Letters Patent No. 733,592, dated July 14, 1903.

Application filed January 14, 1903. Serial No. 138,991. (No model.)

*To all whom it may concern:*

Be it known that I, ROBERT M. PAYNE, a citizen of the United States, residing at Winchester, in the county of Franklin and State of Tennessee, have invented certain new and useful Improvements in Tire-Tighteners; and I do hereby declare the following to be a full, clear, and exact description of the invention, such as will enable others skilled in the art to which it appertains to make and use the same.

My invention has relation to improved means for setting a vehicle-tire to the wheel and for compensating variations of expansion and contraction subsequently emanating during the use of the wheel.

The object is to provide a device of the kind and for the purposes named which is simple in construction, conveniently applied and manipulated, certain in operation, and strong and durable in use.

With these objects in use the invention consists in the novel construction of parts and their assemblage and aggroupment in operative combination, as will be hereinafter fully described and the novelty thereof particularly pointed out and distinctly claimed.

The invention embodies a tire with particular end connections, means to clamp the end connections together, and improved adjusting means for setting the tire as occasion or exigency may require.

I have fully and clearly illustrated the invention in the annexed drawings, forming a part of this specification, wherein—

Figure 1:
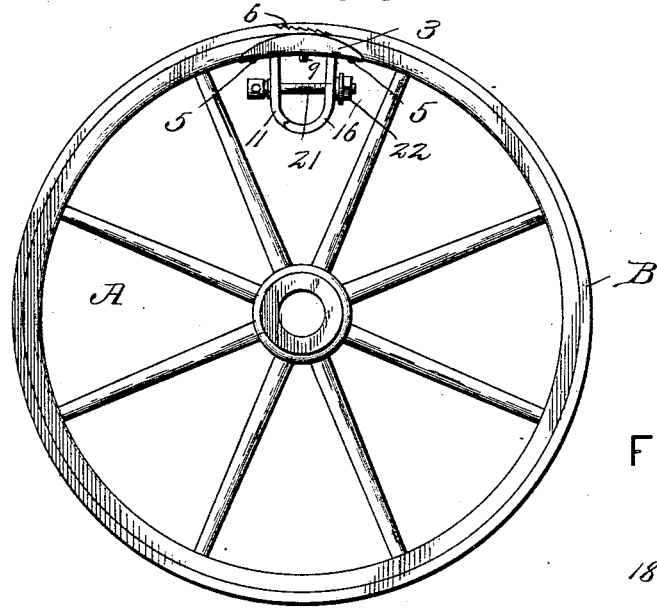
Figure 5:
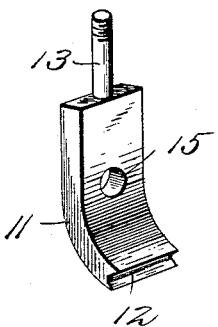
Figure 6:
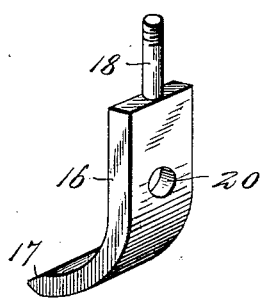
Figure 4:
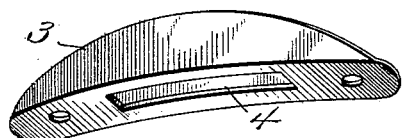
Figure 2:
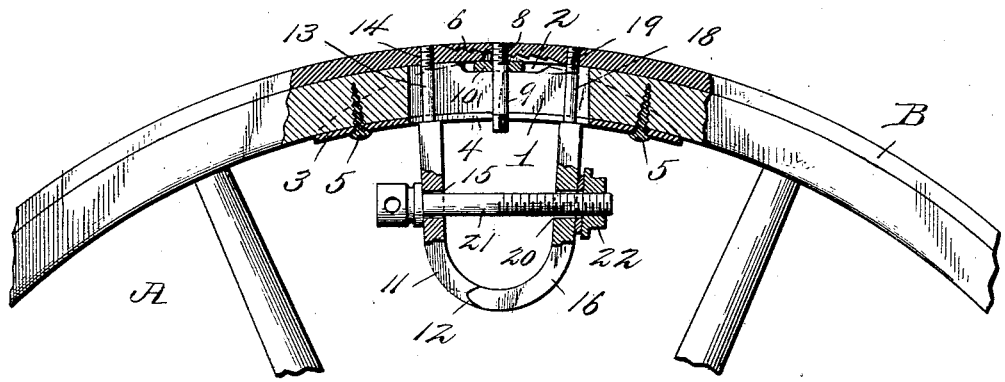
Figure 3:

Figure 1 is a side view in elevation of a vehicle-wheel having a tire formed and equipped with my improvements. Fig. 2 is a detail view of a portion of a wheel partly in central longitudinal section through the felly, showing the device in combination therewith. Fig. 3 is a detail perspective view of one of the lap end portions of the tire. Fig. 4 is a bottom perspective view of the felly-clip, showing the slot in its under part. Fig. 5 is a detail perspective view of one member of the clamping and adjusting jaws, and Fig. 6 is a detail perspective view of the other member of the clamping and adjusting jaws.

In the drawings similar reference notations appearing in the several illustrations indicate like elements or parts.

Referring to the drawings, A designates a vehicle-wheel of any proper construction consisting of a hub, radiating spokes, and felly, constituting the rim of the wheel, secured in any well-known manner to the ends of the spokes. At a point between any two of the spokes in the felly is formed a longitudinal opening or mortise 1, extending vertically through the felly and formed with a depression 2 in its side walls.

3 designates a clip and shield-plate which sets up against the under face of the felly and the side flanges of which set against the sides thereof, as shown. In the plate of the clip is made a slot 4, coincident with the opening 1 through the felly. The clip is secured to the felly by screws 5, projected through it and extending into the felly, substantially as shown.

B designates the tire, consisting of a metal band of selected gage and having its meeting ends lapped upon each other, the contacting surfaces being oppositely inclined and formed with serrations, notches, or teeth 6, which interengage and serve to hold the tire in the position to which it may be adjusted and set. The under member of the lapped ends of the tire is formed with a slot 7, which straddles the clamping-bolt, so as to provide for movement in the operation of the adjustment. In the outer lap of the lapped joint is a threaded aperture 8.

9 designates the clamping-bolt projected through the slot in the felly and the slot 7 in the under lap of the tire and engages with the threaded hole 8. On the bolt 9 is fixed a washer 10, which lies under the lapped joint, so that the threaded portion of the bolt will act to bring the laps together and clamp them in fixed position, as shown in Fig. 2 of the drawings.

11 designates one jaw of the adjusting device. This jaw is curved inward at its lower end and formed with a groove 12 across its end. From the upper end of the jaw is projected a centrally-located stem 13, which engages in a threaded hole 14 in the tire. In the jaw is an aperture 15, through which the clamping-bolt passes.

16 designates the second member or jaw curved inward at its lower end portion and terminates in a rounded end 17 to engage in the groove 12 in the jaw 11. The jaw 16 is formed with a vertical screw-threaded stem 18, which engages in a threaded hole 19 in the tire. The body of the jaw 16 is formed with an aperture 20, intended to aline with the aperture 15 in the jaw 11.

21 designates the clamping-bolt for the jaws, which is positioned in the apertures 15 and 20 and on its threaded end portion is provided with a clamping-nut 22.

It will be perceived that when the jaws are screwed up the shoulders at the base of the stems engage against the clip-plate, so that the engagement of the stems with the tire draw that down firmly on the face of the felly.

The elements of the device may be assembled and applied as follows: The tire may be fitted and arranged on the wheel, then the jaws may be separately screwed in place, and then the clamping-bolt of the jaws arranged in position and the jaws then screwed up to the desired tension, and then the lap-joint screw is screwed up to clamp the lapped joint tightly together.

If in the use of the wheel the tire becomes loose, the bolt 9 is loosened, so as to permit the lapped joint to slide, and then the bolt 21 is screwed up to draw the jaws together and tighten the lap, and then the bolt 9 is screwed up to hold the lapped ends of the tire locked together.

If the wheel swells, so as to cramp or buckle, the bolt 9 is loosened, so as to permit new adjustment, and then the adjustment is made, the bolt 9 screwed up, and then the bolt 21 adjusted to create the proper tension.

Having described my invention, what I claim is—

In a tire-tightener, the combination with the wheel having one of its fellies provided with an opening, of a tire having its meeting ends provided with continuous serrations, and one of said ends having an open-ended slot arranged between its serrations, the other meeting end provided with a screw-threaded opening, and a single screw-threaded bolt passing through the opening of the felly and passing endwise through the open-ended slot so as to adapt the said bolt to engage the screw-threaded opening of the other meeting end of said tire substantially as specified.

In testimony whereof I affix my signature in presence of two witnesses.

ROBERT M. PAYNE.

Witnesses:
 FELIX DAVIS,
 JESSE U. LITTLETON.